(12) United States Patent
Goodwin-Johansson (10) Patent No.: US 6,373,682 B1
(45) Date of Patent: Apr. 16, 2002

(54) ELECTROSTATICALLY CONTROLLED VARIABLE CAPACITOR

(75) Inventor: Scott Halden Goodwin-Johansson, Pittsboro, NC (US)

(73) Assignee: MCNC, Research Triangle Park, NC (US)

( * ) Notice: Subject to any disclaimer, the term of this patent is extended or adjusted under 35 U.S.C. 154(b) by 0 days.

(21) Appl. No.: 09/464,010

(22) Filed: Dec. 15, 1999

(51) Int. Cl.[7] .............................. H01G 5/01; H01G 7/00; H01G 7/06
(52) U.S. Cl. ...................... 361/278; 361/281; 361/283.2
(58) Field of Search .................... 361/277, 278, 361/281, 283.1–283.4, 290

(56) References Cited

U.S. PATENT DOCUMENTS

| | | |
|---|---|---|
| 2,851,618 A | 9/1958 | Krawinkel |
| 2,927,255 A | 3/1960 | Diesel |

(List continued on next page.)

FOREIGN PATENT DOCUMENTS

| | | |
|---|---|---|
| EP | 0 469 749 A1 | 2/1992 |
| EP | 0 665 590 A2 | 8/1995 |
| EP | 08307753 | 11/1996 |
| EP | 08355075 | 12/1996 |
| EP | 0 759 628 A1 | 2/1997 |
| EP | 0 834 759 A2 | 4/1998 |
| JP | 10-189393 | 7/1998 |
| WO | WO99/26333 | 5/1999 |

OTHER PUBLICATIONS

J.A. Walker et al, A Silicon Optical Modulator With 5 MHz Operation For Fiber–In–The–Loop Applications, The 8th International Conference on Solid–State Sensors and Actuators and Eurosensors IX, Jun. 25–29, 1995, pp. 285–288, vol. I, Sessions A1–PD6, Papers No. 1–231, Transducers '95 Eurosensors IX, Stockholm, Sweden.

(List continued on next page.)

Primary Examiner—Dean A. Reichard
Assistant Examiner—Eric W. Thomas
(74) Attorney, Agent, or Firm—Alston & Bird LLP (57) ABSTRACT

A MEMS (Micro Electro Mechanical System) electrostatically operated high voltage variable controlled capacitor device is provided. This device can store high energy over a wide range while using relatively low electrostatic operating voltages. The MEMS device comprises a microelectronic substrate, a substrate signal electrode, and one or more substrate control electrodes. The MEMS device also includes a moveable composite overlying the substrate, having a composite signal electrode, one or more composite control electrodes, and a biasing element. In cross-section, the moveable composite comprises at least one electrode layer and, in most instances, a biasing layer. In length, the moveable composite comprises a fixed portion attached to the underlying substrate and a distal portion moveable with respect to the substrate electrode. The distal and/or medial portions of the moveable composite are biased in position when no electrostatic force is applied. Additionally, the MEMS device comprises insulators to electrically isolate the substrate and electrodes. Applying a variable controlled voltage between the substrate control electrode and moveable composite control electrode, controls the bias of the moveable composite and, in turn, controls the capacitance between the substrate signal electrode and the composite signal electrode. Various embodiments further define the various layering alternatives if the moveable composite, shaping of the electrodes and placement of the electrodes. Additionally, a system for electrostatically controlled variable capacitance comprises a variable controlled voltage source coupled to the control electrodes of the MEMS device of the present invention and a circuit signal electrically coupled to the signal electrodes of the MEMS device. A method of using and a method for making the aforementioned electrostatic MEMS device are also provided.

57 Claims, 7 Drawing Sheets

U.S. PATENT DOCUMENTS

| | | |
|---|---|---|
| 2,942,077 A | 6/1960 | Diesel |
| 3,772,537 A | 11/1973 | Clifford et al. |
| 3,796,976 A | 3/1974 | Heng et al. |
| 3,989,357 A | 11/1976 | Kalt |
| 4,317,611 A | 3/1982 | Petersen |
| 4,516,091 A | 5/1985 | Sasser |
| 4,554,519 A | 11/1985 | Adam |
| 4,581,624 A | 4/1986 | O'Connor |
| 4,598,585 A | 7/1986 | Boxenhorn |
| 4,662,746 A | 5/1987 | Hornbeck |
| 4,692,727 A | 9/1987 | Wakino et al. |
| 4,710,732 A | 12/1987 | Hornbeck |
| 4,736,202 A | 4/1988 | Simpson et al. |
| 4,747,670 A | 5/1988 | Devio et al. |
| 4,789,803 A | 12/1988 | Jacobsen |
| 4,794,370 A | 12/1988 | Simpson et al. |
| 4,826,131 A | 5/1989 | Mikkor |
| 4,857,757 A | 8/1989 | Sato et al. |
| 5,016,072 A | 5/1991 | Greiff |
| 5,043,043 A | 8/1991 | Howe et al. |
| 5,051,643 A | 9/1991 | Dworsky et al. |
| 5,061,049 A | 10/1991 | Hornbeck |
| 5,065,978 A | 11/1991 | Albarda et al. |
| 5,083,857 A | 1/1992 | Hornbeck |
| 5,097,354 A | 3/1992 | Goto |
| 5,164,688 A | 11/1992 | Larson |
| 5,168,249 A | 12/1992 | Larson |
| 5,172,262 A | 12/1992 | Hornbeck |
| 5,179,499 A | 1/1993 | MacDonald et al. |
| 5,202,785 A | 4/1993 | Nelson |
| 5,203,208 A | 4/1993 | Bernstein |
| 5,212,582 A | 5/1993 | Nelson |
| 5,233,459 A | 8/1993 | Bozler et al. |
| 5,258,591 A | 11/1993 | Buck |
| 5,260,596 A | 11/1993 | Dunn et al. |
| 5,268,696 A | 12/1993 | Buck et al. |
| 5,278,368 A | 1/1994 | Kasano et al. |
| 5,311,360 A | 5/1994 | Bloom et al. |
| 5,349,855 A | 9/1994 | Bernstein et al. |
| 5,353,656 A | 10/1994 | Hawkey et al. |
| 5,367,136 A | 11/1994 | Buck |
| 5,367,584 A | 11/1994 | Ghezzo et al. |
| 5,392,650 A | 2/1995 | O'Brien et al. |
| 5,408,355 A | 4/1995 | Rauch et al. |
| 5,408,877 A | 4/1995 | Greiff et al. |
| 5,479,042 A | 12/1995 | James et al. |
| 5,488,863 A | 2/1996 | Mochida et al. |
| 5,492,596 A | 2/1996 | Cho |
| 5,496,436 A | 3/1996 | Bernstein et al. |
| 5,507,911 A | 4/1996 | Greiff |
| 5,515,724 A | 5/1996 | Greiff et al. |
| 5,530,342 A | 6/1996 | Murphy |
| 5,535,902 A | 7/1996 | Greiff |
| 5,536,988 A | 7/1996 | Zhang et al. |
| 5,543,765 A | 8/1996 | Cachier |
| 5,544,001 A | 8/1996 | Ichiya et al. |
| 5,552,925 A | 9/1996 | Worley |
| 5,578,976 A | 11/1996 | Yao |
| 5,616,864 A | 4/1997 | Johnson et al. |
| 5,619,061 A | 4/1997 | Goldsmith et al. |
| 5,620,933 A | 4/1997 | James et al. |
| 5,627,396 A | 5/1997 | James et al. |
| 5,629,565 A | 5/1997 | Schlaak et al. |
| 5,629,790 A | 5/1997 | Neukermans et al. |
| 5,635,638 A | 6/1997 | Geen |
| 5,635,639 A | 6/1997 | Greiff et al. |
| 5,635,640 A | 6/1997 | Geen |
| 5,635,739 A | 6/1997 | Grieff et al. |
| 5,638,946 A | 6/1997 | Zavracky |
| 5,640,133 A | 6/1997 | MacDonald et al. |
| 5,644,177 A | 7/1997 | Guckel et al. |
| 5,644,349 A * | 7/1997 | Martin ..................... 347/46 |
| 5,650,568 A | 7/1997 | Greiff et al. |
| 5,652,374 A | 7/1997 | Chia et al. |
| 5,656,778 A | 8/1997 | Roszhart |
| 5,661,592 A | 8/1997 | Bornstein et al. |
| 5,666,258 A | 9/1997 | Gevatter et al. |
| 5,673,139 A | 9/1997 | Johnson |
| 5,673,785 A | 10/1997 | Schlaak et al. |
| 5,677,823 A | 10/1997 | Smith |
| 5,696,662 A | 12/1997 | Bauhahn |
| 5,723,894 A | 3/1998 | Ueno et al. |
| 5,818,683 A | 10/1998 | Fujii |
| 5,862,003 A | 1/1999 | Saif et al. |
| 5,901,031 A * | 5/1999 | Ishige et al. ................ 361/277 |
| 5,914,553 A | 6/1999 | Adams et al. |
| 6,057,520 A * | 5/2000 | Goodwin-Johansson .... 200/181 |

OTHER PUBLICATIONS

M. Elwenspoek et al, Active Joints For Microrobot Limbs, pp. 221–223, Department of Technology, Uppsala University, Uppsala, Sweden.

Raj B. Apte, et al., Deformable Grating Light Valves For High Resolution Displays, Solid–State Sensor and Actuator Workshop, Jun. 13–16, 1994, pp. 1–6, Hilton Head, South Carolina.

Christopher W. Storment, et al., Dry–Released Process For Aluminum Electrostatic Actuators, Solid–State Sensor and Actuator Workshop, Jun. 13–16, 1994, pp. 95–98, Hilton Head, South Carolina.

Rob Legtenberg, et al., Electrostatic Curved Electrode Actuators, IEEE Robotics and Automation Society in cooperation with the ASME Dynamic Systems and Control Division, Jan. 29–Feb. 2, 1995, pp. 37–42, IEEE Catalog No. 95CH35754, Amsterdam, the Netherlands.

U Breng, et al., Electrostatic Micromechanic Actuators, J. Micromech. Microeng. 2 (1992), pp. 256–261, UK.

J. Haji–Babaei, et al., Integrable Active Microvalve With Surface Micromachined Curled–Up Actuator, 1997 International Conference on Solid–State Sensors and Actuators, Transducers '97, Jun. 16–19, 1997, pp. 833–836, Chicago, Illinois.

V.P. Jaecklin, et al., Mechanical And Optical Properties Of Surface Micromachined Torsional Mirrors In Silicon, Polysilicon and Aluminum, The $7^{th}$ International Conference on Solid–State Sensors and Actuators, pp. 958–961, Neuchâtel, Switzerland.

Devi S. Gunawan, et al., Micromachined Corner Cube Reflectors As A Communication Link, 8253a Sensors and Actuators A—Physical A47, Mar./Apr. 1995, pp. 580–583, Nos. 1/3, 1995 Elsevier Science S.A., Lausanne, CH.

V.P. Jaecklin, et al., Optical Microshutters And Torsional Micromirrors For Light Modulator Arrays, IMT, Institute of Microtechnology, University of Neuchatel, pp. 24–127, Neuchatel, Switzerland.

Erno H. Klaassen, et al., Silicon Fusion Bonding And Deep Reative Ion Etching; A Nw Technology For Microstructures, Transducers '95—Eurosensors IX, Jun. 25–29, 1995, pp. 556–559.

Dr. Kurt Petersen, Single Crystal Silicon Actuators And Sensors Based On Silicon Fusion Bonding Technology, Advanced Research Projects Agency, Apr.–Jul. 1994, pp. 1–13, Semi–Annual Progress Report 1, Lucas NovaSensor, Fremont, California.

Dr. Kurt Petersen, Single Crystal Silicon Actuators And Sensors Based On Silicon Fusion Bonding Technology, Advanced Research Projects Agency, Jul. 1994 Jan. 1995, pp. 1–18, Semi–Annual Progress Report 2, Lucas NovaSensor, Fremont, California.

R.N. Kleiman, Single–Crystal Silicon High–Q Torsional Oscillators, 1985 American Institute of Physics, Nov. 1995, pp. 2088–2091.

Kurt E. Petersen, Silicon Torsional Scanning Mirror, Sep. 1980, pp. 631–637, vol. 24, No. 5, IBM J. Res. Develop.

B. Diem, et al., SOI (SIMOX) As A Substrate For Surface Micromachining Of Single Crystalline Silicon Sensors And Actuators, The 7$^{th}$ International Conference on Solid–State Sensors and Actuators, pp. 233–236.

M. Elwenspoek, et al., Static And Dynamic Properties Of Active Joints, The 8$^{th}$ International Conference on Solid–State Sensors and Actuators and Eurosensors IX, Jun. 25–29, 1995, pp. 412–415, Transducers '95 Eurosensors IX, Stockholm, Sweden.

Ignaz Schiele, et al., Surface–Micromachined Electrostatic Microrelay, Sensors and Actuators A 66 (1998), pp. 345–354, Elsevier, Munich, Germany.

K. Deng, The Development Of Polysilicon Micromotors For Optical Scanning Applications, Electroonics Design Center, Department Of Electrical Engineering And Applied Physics, Case Western Reserve University, Cleveland, Ohio.

Buser and Deroolj, Very High Q–Factor Resonators In Monocrystalline Silicon, Sensors and Actuators A21–A23, 1990, pp. 323–327, Elsevier Sequoia, Neuchâtel, Switzerland.

* cited by examiner

ELECTROSTATICALLY CONTROLLED VARIABLE CAPACITOR

FIELD OF THE INVENTION

The present invention relates to microelectromechanical capacitor structures, and more particularly to variably controlled, electrostatically activated, high-voltage capacitor structures.

BACKGROUND OF THE INVENTION

Advances in thin film technology have enabled the development of sophisticated integrated circuits. This advanced semiconductor technology has also been leveraged to create MEMS (Micro Electro Mechanical System) structures. MEMS structures are typically capable of motion or applying force. Many different varieties of MEMS devices have been created, including microsensors, microgears, micromotors, and other microengineered devices. MEMS devices are being developed for a wide variety of applications because they provide the advantages of low cost, high reliability and extremely small size.

Design freedom afforded to engineers of MEMS devices has led to the development of various techniques and structures for providing the force necessary to cause the desired motion within microstructures. For example, microcantilevers have been used to apply rotational mechanical force to rotate micromachined springs and gears. Electromagnetic fields have been used to drive micromotors. Piezoelectric forces have also been successfully been used to controllably move micromachined structures. Controlled thermal expansion of actuators or other MEMS components has been used to create forces for driving microdevices. One such device is found in U.S. Pat. No. 5,475,318 entitled "Microprobe" issued Dec. 12, 1995 in the name of inventors Marcus et al., which leverages thermal expansion to move a microdevice. A micro cantilever is constructed from materials having different thermal coefficients of expansion. When heated, the bimorph layers arch differently, causing the micro cantilever to move accordingly. A similar mechanism is used to activate a micromachined thermal switch as described in U.S. Pat. No. 5,463,233 entitled "Micromachined Thermal Switch" issued Oct. 31, 1995 in the name of inventor Norling.

Electrostatic forces have also been used to move structures. Traditional electrostatic devices were constructed from laminated films cut from plastic or mylar materials. A flexible electrode was attached to the film, and another electrode was affixed to a base structure. Electrically energizing the respective electrodes created an electrostatic force attracting the electrodes to each other or repelling them from each other. A representative example of these devices is found in U.S. Pat. No. 4,266,339 entitled "Method for Making Rolling Electrode for Electrostatic Device" issued May 12, 1981 in the name of inventor Kalt. These devices work well for typical motive applications, but these devices cannot be constructed in dimensions suitable for miniaturized integrated circuits, biomedical applications, or MEMS structures.

MEMS electrostatic capacitors are used advantageously in various applications because of their extremely small size. Electrostatic forces due to the electric field between electrical charges can generate relatively large forces given the small electrode separations inherent in MEMS devices. However, problems may arise when these miniaturized devices are used in high voltage applications. Because MEMS devices include structures separated by micron scale dimensions, high voltages can create electrical arcing and other related problems. In typical MEMS devices, the air gap separation between the substrate electrode and moveable composite electrode affects the electrostatic voltage required to move the composite electrode and operate the device. A relatively large air gap is beneficial for minimizing high voltage problems. However, the larger the air gaps, the higher the voltage required to operate the electrostatic MEMS device. As such, traditional MEMS electrostatic devices are not well suited for high voltage switching applications.

It would be advantageous to form high voltage capacitors using MEMS devices operable with relatively low electrostatic voltages. Additionally, it would advantageous to provide for a MEMS structure having a larger air gap separation between the substrate electrode and the moveable composite electrode than has been previously exhibited in MEMS capacitors. The larger air gap would allow for very small capacitance for a given area and, hence, a variable capacitor over an extended range. It would also be beneficial to provide for a MEMS capacitor that minimizes the occurrence of stiction between the substrate and moveable composite. Stiction, which is a well-known concept in microelectronics, is defined as the tendency for contacting MEMS surfaces to stick to one another. In addition, it would be advantageous to develop a MEMS variable capacitor that exhibits complete electrical isolation between the capacitor plates. Furthermore, it would be advantageous to provide a variably controlled MEMS electrostatic capacitor that overcomes at least some of the arcing and high voltage operational problems attributed to typical MEMS devices. There is still a need to develop improved MEMS devices for variable controlled capacitors while leveraging electrostatic forces. In addition, leveraging the electrostatic forces in new variable controlled MEMS capacitors could create advantageous new devices and applications.

SUMMARY OF THE INVENTION

The present invention provides for improved MEMS electrostatic devices that can operate as high voltage, variable controlled capacitors. Further, a method for using and a method for making the MEMS electrostatic device according to the present invention are provided.

A MEMS device driven by electrostatic forces according to the present invention comprises a microelectronic substrate, a substrate signal electrode, and one or more substrate control electrodes. Further, the MEMS device of the present invention includes a moveable composite having a composite signal electrode, one or more substrate control electrodes and a biasing element. Additionally, insulators are provided to insure electrical isolation between the electrodes. A microelectronic substrate defines a generally planar surface upon which the MEMS device is constructed. The substrate signal electrode and the substrate control electrode form at least one layer on the surface of the microelectronic substrate. The moveable composite is attached to the substrate construct and overlies the substrate electrodes. In cross section, the moveable composite generally comprises one or more electrode layers and, in most embodiments, a biasing layer. The moveable composite across its length comprises a fixed portion attached to the underlying substrate, a medial portion adjacent to the fixed portion and a distal portion adjacent to the medial portion. The medial and distal portions being moveable with respect to the substrate electrode. Applying a voltage between the substrate control electrode and moveable composite control electrode creates an electrostatic force that attracts the moveable distal portion of the composite to the underlying microelectronic substrate and controls biasing. As such, the resulting capacitance between the substrate signal electrode and the moveable composite signal electrode is effectively controlled.

One embodiment of the MEMS electrostatic device according to the present invention forms one or more layers of the moveable composite from one or more generally flexible materials. Layers comprising the composite can be selected such that the moveable composite substantially conforms to the surface of the microelectronic substrate when the distal portion of the moveable composite is attracted to the microelectronic substrate. In addition, layers comprising the composite can be selected such that the distal portion can be positionally biased with respect to the microelectronic substrate when no electrostatic force is applied.

Alternatively, another embodiment of the present invention allows for the relative area and the shape of the control electrodes to be adjusted so as to control the bias between the moveable composite while maintaining constant voltage. Additionally, another embodiment of the present invention allows for the surface area of the moveable composite to be generally fully covered with a combination of signal and control electrodes for the purpose of insuring uniformity and consistency in the movement of the composite.

In addition, another embodiment of the present invention provides a method of using the electrostatic MEMS devices described above. The method comprises the step of selectively generating a variable electrostatic force between the substrate control electrode and the composite control electrode. Further, the method comprises moving the moveable composite toward the substrate in response to the variable electrostatic force to vary the capacitance between the substrate signal electrode and the composite signal electrode.

In yet another embodiment of the present invention, a method is provided for making the electrostatic MEMS device described above. The method comprises the steps of selecting a microelectronic substrate, forming a substrate signal electrode within layer on the planar surface of the substrate, forming a substrate control electrode within a layer on the planar surface of the substrate and forming a release layer over a portion of the uppermost surface of the substrate construct. Additionally, the method comprises the steps of attaching a moveable composite having a signal electrode, control electrode and a biasing element to the uppermost surface of the substrate construct and removing the release layer to create an air gap between the substrate construct and the moveable composite.

The moveable composite design of the MEMS high voltage capacitors of the present invention are operable with relatively low electrostatic voltages. Additionally, the large air gap separation between the moveable composite and the substrate results in very small capacitance for a given area and, therefore, variable capacitance can be achieved over a larger range than previous MEMS variable capacitors. Additional benefit is realized by the variable capacitor of the present invention in that the curled nature of the medial and distal portions of the moveable composite lessen the occurrence of stiction resulting between the substrate and the moveable composite. The variable capacitor of the present invention is able to provide complete electrical isolation between the control and signal electrodes by providing for the use of flexible insulting polymer films in the moveable composite. As such, MEMS variably controlled capacitors that have these improved performance characteristics, and many others that will be readily apparent to those of ordinary skill in the art, are desired for many new microelectronic devices and applications.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
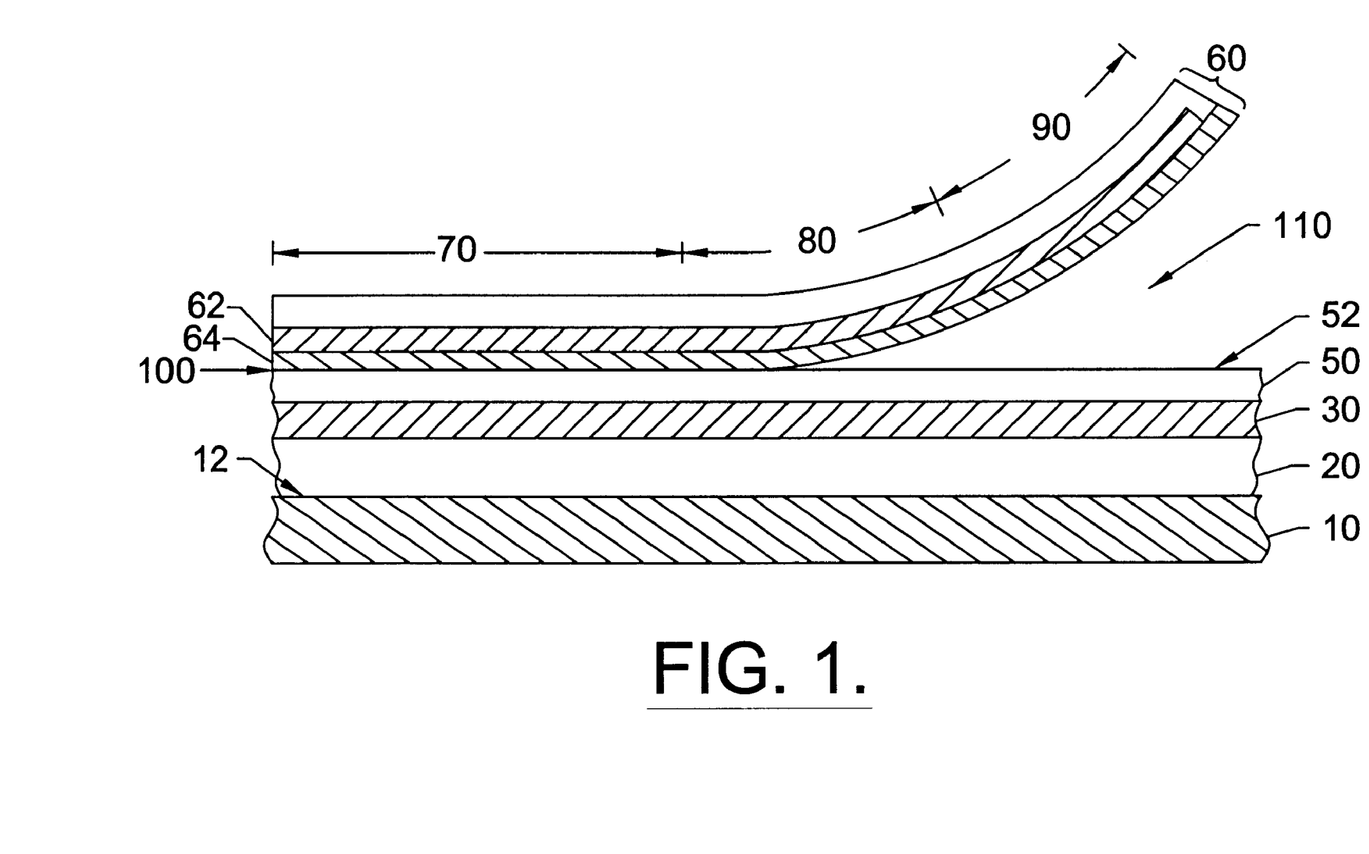
FIG. 1 is a cross-sectional view of a MEMS capacitor structure in accordance with an embodiment of the present invention.
Figure 2:
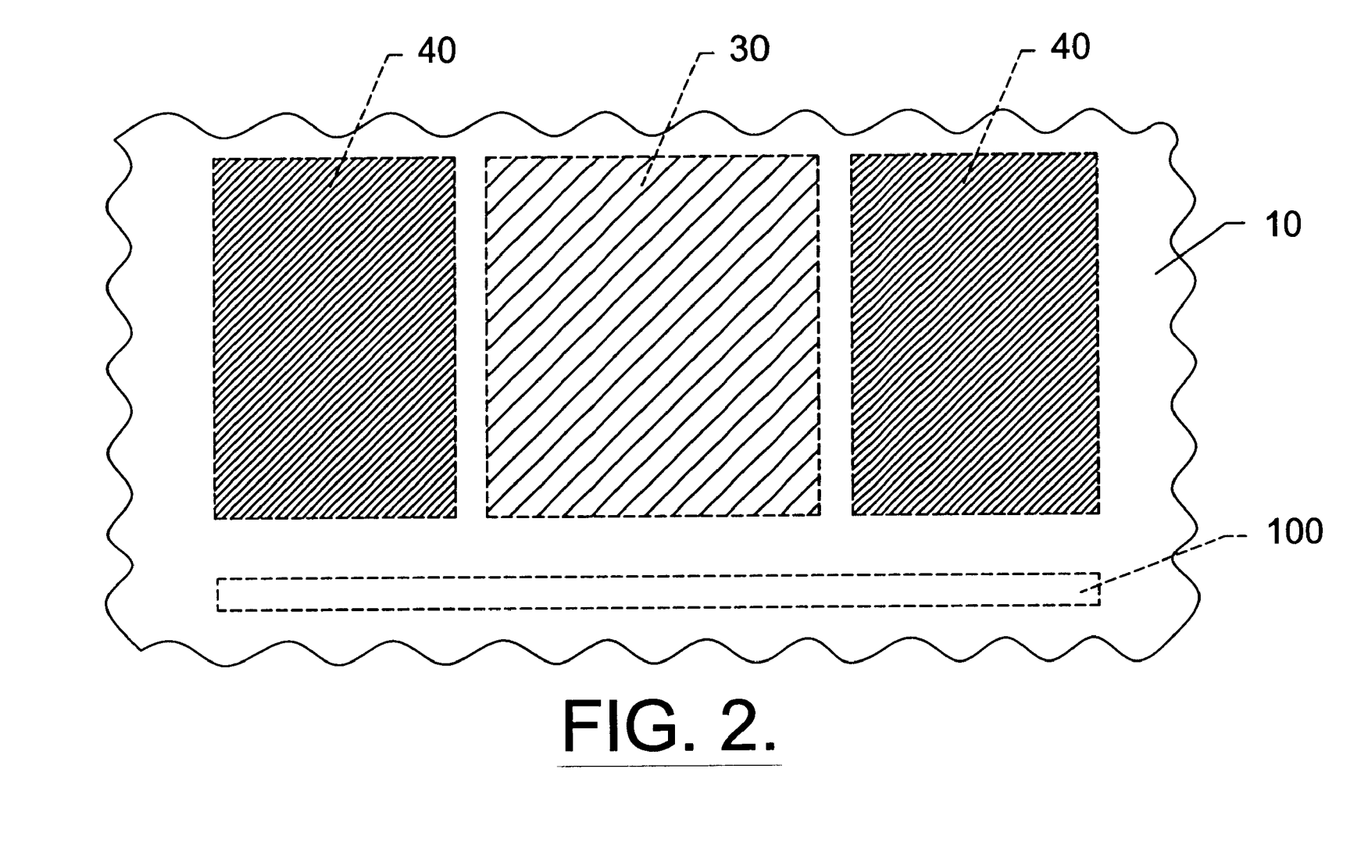
FIG. 2 is a top plan view of a MEMS capacitor substrate in accordance with an embodiment of the present invention.

Referring to FIGS. 1 and 2, a cross-sectional view (FIG. 1) and a top view of the substrate construct (FIG. 2) of a present embodiment of the present invention provides a MEMS device driven by electrostatic forces that can provide variable capacitance. As shown in FIG. 1, the layers of the MEMS device construct are arranged and shown vertically. In a first embodiment, an electrostatic MEMS device comprises in layers, a microelectronic substrate 10, a first insulating layer 20, substrate signal electrode 30, substrate control electrode(s) 40 (shown in FIG. 2), a substrate insulator 50, and a moveable composite 60. The substrate signal electrode and the substrate control electrode(s) are electrically isolated via insulators and/or layer separation. The moveable composite is generally planar and overlies a portion of the microelectronic substrate and, generally, the entirety of the substrate electrodes.

The movable composite may be seen as having three portions referred to as the fixed portion 70, the medial portion 80 and the distal portion 90. They are deposited horizontally along the length of the moveable composite. The fixed portion is substantially affixed to the underlying microelectronic substrate or intermediate layers at the attachment point 100. The medial portion and distal portion are released from the underlying substrate or intermediate layers during fabrication of the MEMS device. An air gap 110 results from the release operation and defines the region between the medial portion, distal portion, and the planar surface of the underlying microelectronic substrate or intermediate layers. By predefining the shape of the air gap, recently developed MEMS electrostatic devices can operate with lower and less erratic operating voltages. Further discussion of recently development MEMS electrostatic devices is being omitted from this disclosure so as not to overcomplicate the present invention. For an example of a recently developed improved MEMS device, see U.S. Pat. application Ser. No. 09/320,891, entitled "Micromachined Electrostatic Actuator with Air Gap" filed on May 27, 1999 now U.S. Pat. No. 6,236,491, in the name of inventor Goodwin-Johansson and assigned to MCNC, the assignee of the present invention. That application is herein incorporated by reference as if set forth fully herein.

During MEMS device operation either the distal portion of the device or both the medial and distal portions are moveable with respect to the underlying substrate and substrate electrode. The medial portion extends from the fixed portion and is biased or held in position without the application of electrostatic force. The distal portion extends from the medial portion, and is also biased or held in position without the application of electrostatic force. However, in some embodiments, the medial portion may be held in position whether or not electrostatic force is applied, such that only the distal portion is free to move in operation.

In the FIG. 1 cross-sectional view, the moveable composite 60 comprises multiple layers including at least one signal electrode layer 62 and at least one biasing element layer 64 and/or 65. Additionally, as shown in the FIG. 3 perspective view, the moveable composite will comprise at least one control electrode(s) 68. The control electrode(s) may be included generally within the signal electrode layer or the control electrode(s) may comprise an additional layer within the moveable composite. The moveable composite signal electrode and the moveable composite control electrode(s) are electrically isolated, typically, via the implementation of insulators and/or layer separation.

The electrostatic MEMS device, including the moveable composite and underlying substrate layers, is constructed using known integrated circuit materials and microengineering techniques. Those skilled in the art will understand that different materials, various numbers of layers, and numerous arrangements of layers may also be used to form the underlying substrate layers and the moveable composite. Although the MEMS device illustrated in the figures will be used as an example to describe manufacturing details, this discussion applies equally to all MEMS devices provided by the present invention unless otherwise noted.

Referring to FIGS. 1 and 2, a microelectronic substrate 10 defines a planar surface 12 upon which the-electrostatic MEMS device is constructed. Preferably the microelectronic substrate comprises a quartz substrate, although any suitable insulating substrate material having a generally planar surface can be used. The insulating characteristic of the substrate is favored because of the high Q nature of the capacitor of the present invention. By way of example, other semiconductor, glass, or other suitable microelectronic materials having insulating tendencies may serve as the substrate. A first insulating layer 20 overlies the planar surface of the microelectronic substrate and provides electrical isolation. The first insulating layer preferably comprises a non-oxidation-based insulator or polymer, such as polyimide or nitride. In this application, oxide based insulators are avoided if certain acids (such as hydrofluoric acid) are used in processing to remove the release layer. The first insulating layer is preferably formed by using a standard deposition technique, such as low-pressure chemical vapor deposition (LECVD), to deposit the insulating layer on the planar surface of the microelectronic substrate.

A substrate signal electrode 30 is deposited as a generally planar layer affixed to at least a portion of the surface of the underlying first insulating layer 20. The substrate signal electrode preferably comprises a gold layer deposited on the top surface of the insulating layer. If the substrate signal electrode is formed from a layer of gold, optionally a thin layer of chromium may be deposited either prior to depositing the substrate signal electrode layer to allow better adhesion to the insulating layer or after the substrate signal electrode layer has been deposited to allow better adhesion to any subsequent adjacent materials. Alternatively, other suitable metallic or conductive materials may be used for the substrate signal electrode so long as release layer processing operations does not erode them. Standard photolithography and etching techniques are typically used to deposit the electrodes on the surface of the substrate.

A substrate control electrode(s) 40 is deposited within at least one layer of the microelectronic substrate construct. The substrate control electrode(s) may be deposited in a layer(s) prior to the formation of the substrate signal electrode or after the formation of the substrate signal electrode. If two or more substrate control electrodes are employed they may be formed in two or more layers of the substrate construct. The substrate control electrode preferably comprises a gold layer deposited on the top surface of an insulating layer. If the substrate control electrode is formed from a layer of gold, optionally a thin layer of chromium may be deposited either prior to depositing the substrate electrode layer to allow better adhesion to the insulating layer or after the substrate control electrode layer has been deposited to allow better adhesion to any subsequent adjacent materials. Alternatively, other suitable metallic or conductive materials may be used for the substrate signal The substrate signal electrode and the substrate control electrode(s) shall be electrically isolated. In an embodiment in which the substrate signal electrode and the substrate control electrode lie generally in the same layer an insulating material may be deposited within portions of the layer to physically separate and electrically isolate the electrode components within the layer. In an alternate embodiment electrical isolation is accomplished by forming one or more intermediate insulation layers (not shown in FIGS. 1 and 2) between the layer comprising the substrate signal electrode and the layer comprising the substrate control electrode(s). The intermediate insulating layer(s) preferably comprise polyimide; although other dielectric insulators or polymers tolerant of release layer processing may also be used. The intermediate insulating layer(s) are preferably formed by using a standard deposition technique, such as physical vapor deposition (PVD), to deposit the insulating layer on the planar surface of the microelectronic substrate.

Once the substrate signal electrode and the substrate control electrode have been formed, preferably, a substrate insulating layer 50 is deposited on the uppermost of the substrate signal electrode layer or the substrate control electrode layer to electrically isolate the substrate signal and control electrodes and prevent electrical shorting. Further, the substrate-insulating layer provides a dielectric layer of predetermined thickness between the substrate electrodes 30 and 40 and the moveable composite 60, including the composite moveable electrodes 66 and 68. The substrate-insulating layer 50 preferably comprises polyimide, although other dielectric insulators or polymers tolerant of release layer processing may also be used. The substrate-insulating layer has a generally planar surface 52 and is formed using a conventional deposition technique, such as PVD.

A release layer (not shown in FIGS. 1 and 2), is deposited on the planar surface 52 of the substrate insulating layer in the area underneath the medial and distal portions of the overlying moveable composite. The release layer is only deposited on those regions below moveable composite portions not being affixed to the underlying planar surface. Preferably, the release layer comprises an oxide or other suitable material that may be etched away when acid is applied thereto. After the overlying layers of the moveable composite have been deposited on the substrate, the release layer may be removed through standard microengineering acidic etching techniques, such as a hydrofluoric acid etch. When the release layer has been removed, the medial and distal portions of moveable composite 60 are separated from the underlying planar surface 52, creating the air gap 110 between the moveable composite and the underlying planar surface. The shape of the air gap is determined according to the bias provided to the distal portion and/or medial portion of the moveable composite when no electrostatic force is applied. A generally large air gap may be formed that allows for qualitatively small capacitance to exist across a given area and, therefore, a variable capacitance over a larger range than has be realized in previous MEMS variable capacitors. The release of the moveable composite from the substrate will typically result in the thin film composite having a medial and/or distal portion that has a curled shape. The curled nature of the moveable composite lessens the occurrence of stiction between the moveable composite and the substrate.

Figure 3:
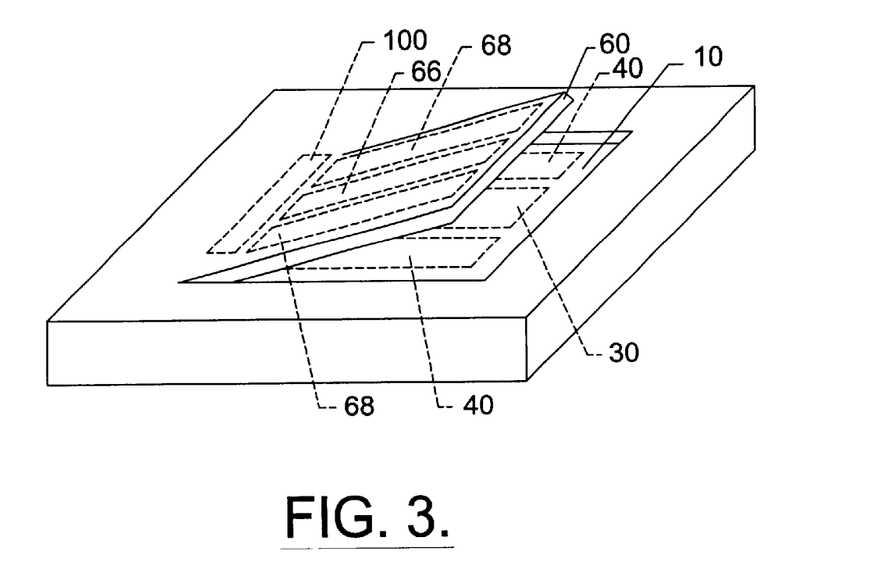
FIG. 3 is a perspective view of a MEMS capacitor device in accordance with an embodiment of the present invention.
Figure 4:
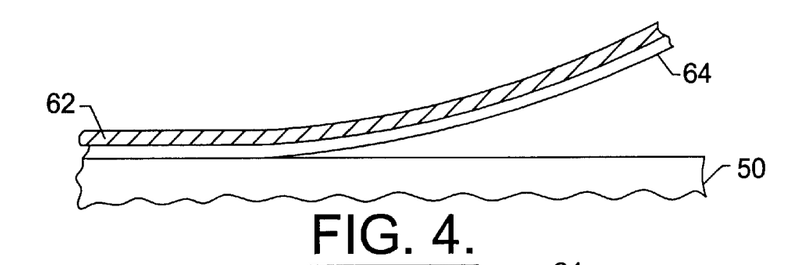
FIG. 4 is a cross-sectional view of the moveable composite of the MEMS capacitor structure in accordance with an embodiment of the present invention.
Figure 5:
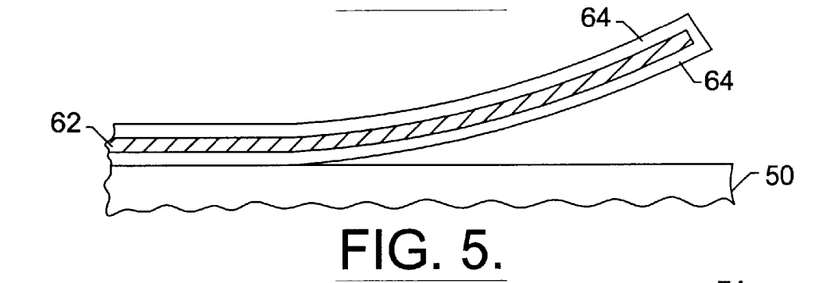
FIG. 5 is a cross-sectional view of the moveable composite of the MEMS capacitor structure in accordance with an alternate embodiment of the present invention.
Figure 6:
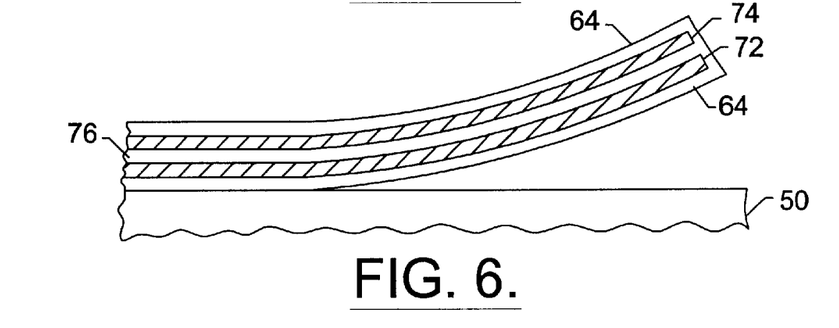
FIG. 6 is a cross-sectional view of the moveable composite of the MEMS capacitor structure in accordance with an alternate embodiment of the present invention.

The layers of the moveable composite 60 generally overlie planar surface 52. Known integrated circuit manufacturing processes are used to construct the layers comprising moveable composite 60. The moveable composite is comprised of a signal electrode, a control electrode and a biasing element. Preferably, one or more layers of the moveable composite comprise the signal electrode and the control electrodes and one or more additional layers comprise the biasing element. FIGS. 4–6 depict cross-sectional views of alternative embodiments of the layer construction within the moveable composite. FIG. 4 shows an electrode layer 62 having a signal electrode and control electrode included within the layer, i.e. layers 66 and 68 shown in FIG. 3, and a biasing layer 64 deposited on the side of the electrode layer closest the substrate. Alternatively, the biasing layer 64 can be deposited on the opposite side of the electrode layer 62 or, as shown in FIG. 5, on both sides of the electrode layer 62. The selection of the biasing layer configuration is based on the desired positioning (i.e. biasing) of the moveable composite. As a still further embodiment, and depending upon the insulation and dielectric characteristics of the substrate insulating layer 50, biasing layer 64 may be deposited above the electrode layer 62 as in the FIG. 4 and FIG. 5 embodiments electrical isolation between the side-by-side signal electrode and control electrode(s) is accomplished by depositing an insulating material between the two or more electrodes, as shown generally in FIG. 3. In yet another embodiment, FIG. 6 illustrates a moveable composite having individual layers for the signal electrode 72 and the control electrode(s) 74. In this embodiment an insulation layer 76 is deposited between the signal electrode layer and the control electrode layer to insure electrical isolation. A biasing layer 64 is deposited on both of the outside surfaces of the signal electrode layer and the control electrode layer. The selection of the biasing layer configuration is based on the desired positioning (i.e. biasing) of the moveable composite.

Preferably, at least one of the layers comprising the moveable composite is formed from a flexible material, for instance flexible polymers (i.e. the biasing element) and/or flexible conductors (i.e. the electrodes) may be used. In a preferred embodiment the biasing element will comprise a flexible polymer film used to hold the moveable composite in a stationary position absent electrostatic forces. The flexible polymer film that may comprise the biasing layer may also serve as an insulator that allows for the complete electrical isolation between the control and signal electrodes. The polymer film layer may, preferably, comprise a polyimide material, however, other suitable flexible polymers capable of withstanding the release layer etch process can also be employed.

Moveable signal electrode 66 and control electrode(s) 68 preferably comprise a layer of flexible conductor material. The moveable signal and control electrodes may be deposited directly upon the uppermost planar surface of the substrate construct and the release layer or over an optional first biasing layer (i.e. polymer film), as needed. The composite signal electrode and the composite control electrode preferably comprise gold, although other conductors tolerant of release layer processing and flexible, such as conductive polymer film, may be used. The surface area and/or configuration of composite signal electrode and composite control electrode(s) can be varied as required to create the desired electrostatic forces to operate the high voltage MEMS device. If gold is used to form the composite signal electrode and or composite control electrode(s), a thin layer of chromium may be deposited onto the composite electrode layer to allow better adhesion of the gold layer to the adjacent materials, such as to one or more layers of polymer film or insulating material.

The number of layers, thickness of layers, arrangement of layers, and choice of materials used in the moveable composite may be selected to bias the moveable composite as required. In particular, the distal portion and/or the medial portion can be varyingly biased as they extend from the fixed portion. The biased position of the medial and distal portions can be customized individually or collectively to provide a desired separation from the underlying planar surface and the substrate electrode. The distal and medial portions can be biased to remain parallel to the underlying planar surface. Alternatively, the distal and medial portions can be biased to alter the separation from the underlying planar surface by curling toward or curling away from the underlying planar surface. Preferably, the distal portion and optionally the medial portion are biased to curl away from the underlying substrate and alter the separation therefrom. Those skilled in the art will appreciate that more than one polymer film layer may be used, and that the films may be deposited on either side or both sides of the composite electrodes.

By way of example, in one embodiment of the present invention, the air gap is greatest at the end of the distal portion and gradually decreases until the fixed portion of the moveable composite contacts the underlying substrate at the fixed portion interface, as shown in FIG. 1. In this embodiment the slope of the air gap in the medial portion of the moveable composite is generally consistent with the slope of the air gap in the distal portion.

Figure 7:
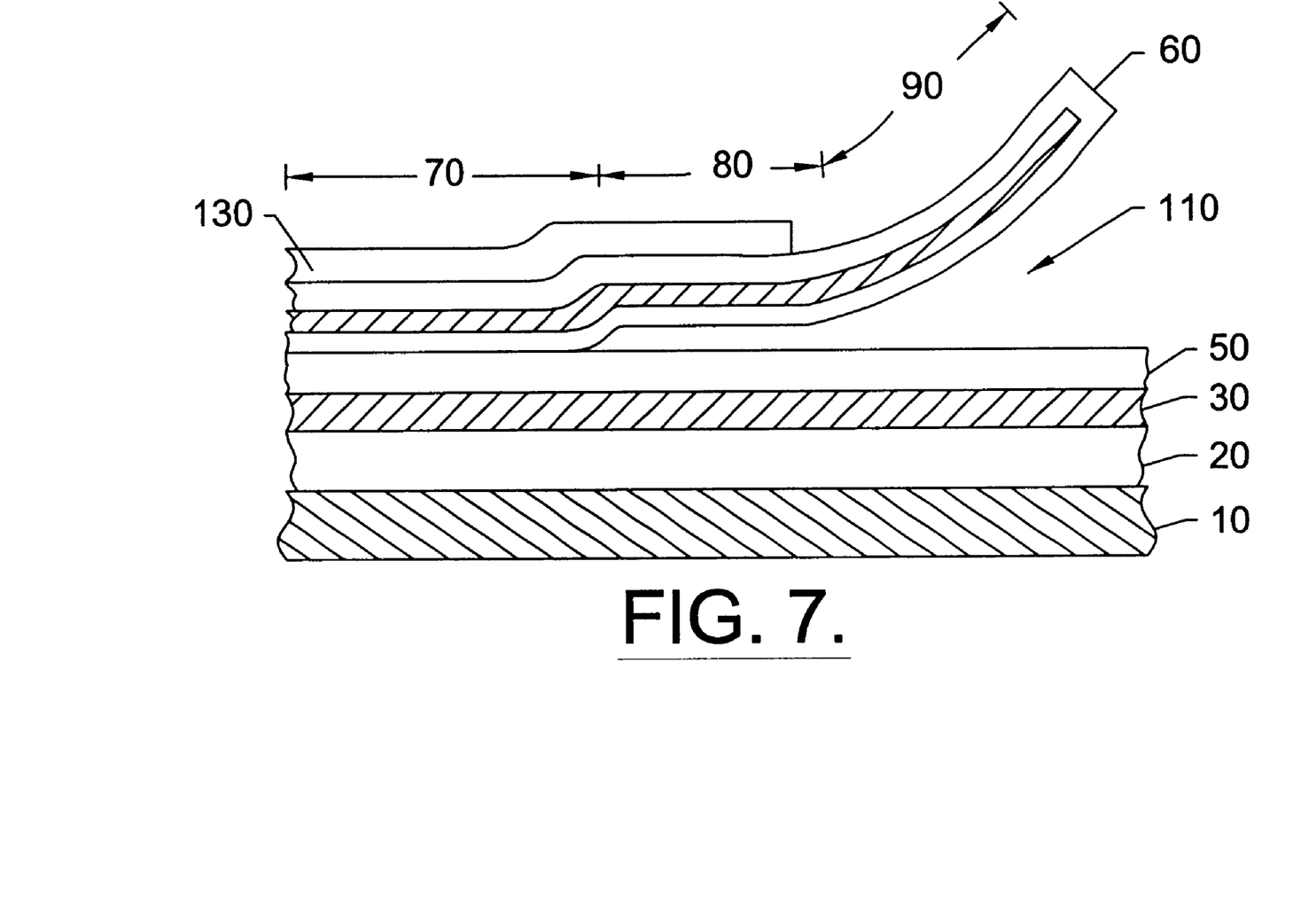
FIG. 7 is a cross-sectional view of a MEMS capacitor structure in accordance with an alternate embodiment of the present invention.
Figure 8:
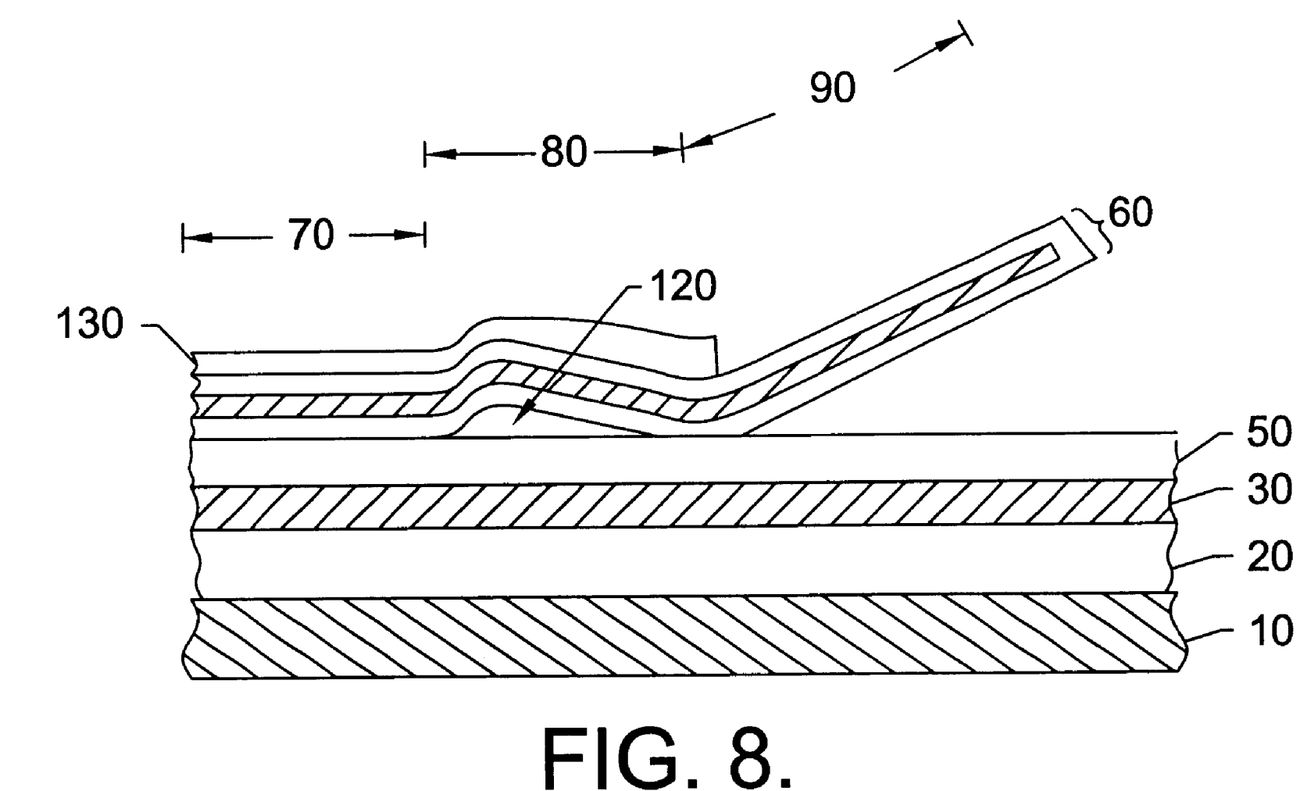
FIG. 8 is a cross-sectional view of a MEMS capacitor structure in accordance with an alternate embodiment of the present invention.

In another embodiment of the present invention, shown in FIG. 7, the air gap 110 is greatest at the end of the distal portion 90 and gradually decreases until the medial portion 80 presents a portion of the air gap with generally constant width. In this embodiment the air gap and the medial portion abruptly end where the fixed portion 70 of the moveable composite contacts the underlying substrate. The medial portion in FIG. 7 has a generally cantilevered segment overlying the substrate proximate the fixed portion. The air gap that is formed in the medial region has a generally constant separation, which facilitates operation. Alternatively, a decreasing air gap 120 as shown in FIG. 8 may be created in the medial portion of the moveable composite. In this embodiment the cantilevered portion slopes downward until it contacts the underlying planar surface at which point the moveable composite transitions into the distal portion and the composite curls away from the underlying planar surface. Various manufacturing techniques can be used to form both the constant depth and downward sloped cantilevered segments of the medial portion shown in FIGS. 7 and 8.

FIGS. 7 and 8 illustrate, by way of example, techniques used to form the medial portion cantilever segment. An additional biasing control element 130 can be applied over the uppermost layer of the moveable composite so that the additional biasing control element overlies the fixed portion and the medial portion. As a result of the additional biasing control element, the medial portion becomes more rigid, limiting its flexibility. To effect a medial portion that slopes downward and contacts the underlying planar surface the additional biasing element 130 may include increased layer thickness at the end of the portion nearest the distal portion. The additional biasing control element can be formed from a metallized layer having a thermal coefficient of expansion tending to hold the medial portion in position. Other materials that have a thermal coefficient of expansion differing from the underlying flexible composite materials may also be used as additional biasing element materials. The additional biasing control element may be a generally solid planar surface or may comprise lines, grids, cross-hatchings, etc., patterned into the biasing control element to support the medial portion and control the air gap. Additionally the cantilevered effect may be implemented by other techniques, such as, altering the thickness of a single biasing element layer in the medial portion, removing portions of the biasing element layer in the medial portion and altering the thermal coefficient of expansion in the medial portion.

At least one of the layers comprising the moveable composite can function as a composite-biasing element used to bias or urge the moveable composite to curl as required. Preferably, the medial portion 80 and distal portion 90 are biased to curl away from the underlying surface 52, after the release layer has been removed. Providing differential thermal coefficients of expansion between the layers comprising the moveable composite can create bias. Assuming an increase in temperature, the moveable composite will curl toward the layer having the lower thermal coefficient of expansion because the layers accordingly expand at different rates. As such, the moveable composite having two layers with different thermal coefficients of expansion will curl toward the layer having a lower thermal coefficient of expansion as the temperature rises. In addition, two polymer film layers having different thermal coefficients of expansion can be used in tandem with an electrode layer to bias the moveable composite as necessary.

Additionally, other techniques may be used to bias the moveable composite. For example, different deposition processes can be used to create intrinsic stresses so as to curl the layers comprising the flexible composite. Further, the moveable composite can be curled by creating intrinsic mechanical stresses in the layers included therein. In addition, sequential temperature changes can be used to curl the moveable composite. For instance, the polymer film can be deposited as a liquid and then cured by elevated temperatures so that it forms a solid polymer layer. Preferably, a polymer having a higher thermal coefficient of expansion than the electrode layer can be used. Next, the polymer layer and electrode layer are cooled, creating stresses due to differences in the thermal coefficients of expansion. Inherently, the flexible composite curls because the polymer layer shrinks faster than the electrode layer.

Further, the relative thickness of the layers comprising the moveable composite and the order in which the layers are arranged can be selected to create bias. In addition, two or more polymer films of different thickness can be used on either side of the electrode layer for biasing purposes. Additionally, the thickness of the moveable electrode layer (s), the relative area and/or shape of the electrodes, the quantity of control and source electrodes and the positioning of the electrodes can also be selected to provide the necessary bias. As such, the medial portion and distal portion can be positionally biased and urged to curl with respect to the microelectronic substrate and substrate electrodes. In one embodiment, the distal portion of the moveable composite curls away from the plane defined by the upper surface of the moveable composite when no electrostatic force is created between the substrate electrode(s) and the composite electrode layer(s). In yet another embodiment, the medial portion of the moveable composite curls inward, toward the plane defined by the upper surface of the moveable composite when no electrostatic force is created between the substrate electrode(s) and the composite electrode layer(s). Further, the medial portion, the distal portion, or both can be biased to curl with any selected radius of curvature along the span of the portion, such as a variable or constant radius of curvature.

Further, the characteristics of the substrate electrode and composite electrode may be customized as needed for given variable capacitor applications. The surface area and shape of the substrate electrode 30 can be varied as required to create the desired electrostatic forces. FIGS. 2 and 3 illustrate rectangular-shaped control and signal electrodes, however, the signal and control electrodes may be tapered, triangular, circular, or any other desirable shape that yields the desired electrostatic force between the control electrodes and capacitance between the signal electrodes. In addition, the substrate electrode can have varying degrees of overlap with the moveable composite 60. In one embodiment, the substrate electrode underlies substantially the entire area of the distal portion 90 of the moveable composite. The overlap between the substrate electrode and composite electrode can also be used to customize the characteristics of the electrostatic device. In one embodiment, the surface area of the substrate electrode comprises generally the same area as the moveable composite electrode. A further embodiment provides a substrate electrode having generally the same shape as the moveable composite electrode. One embodiment provides a moveable composite and the constituent layers having a generally rectangular shape.

Figure 9:
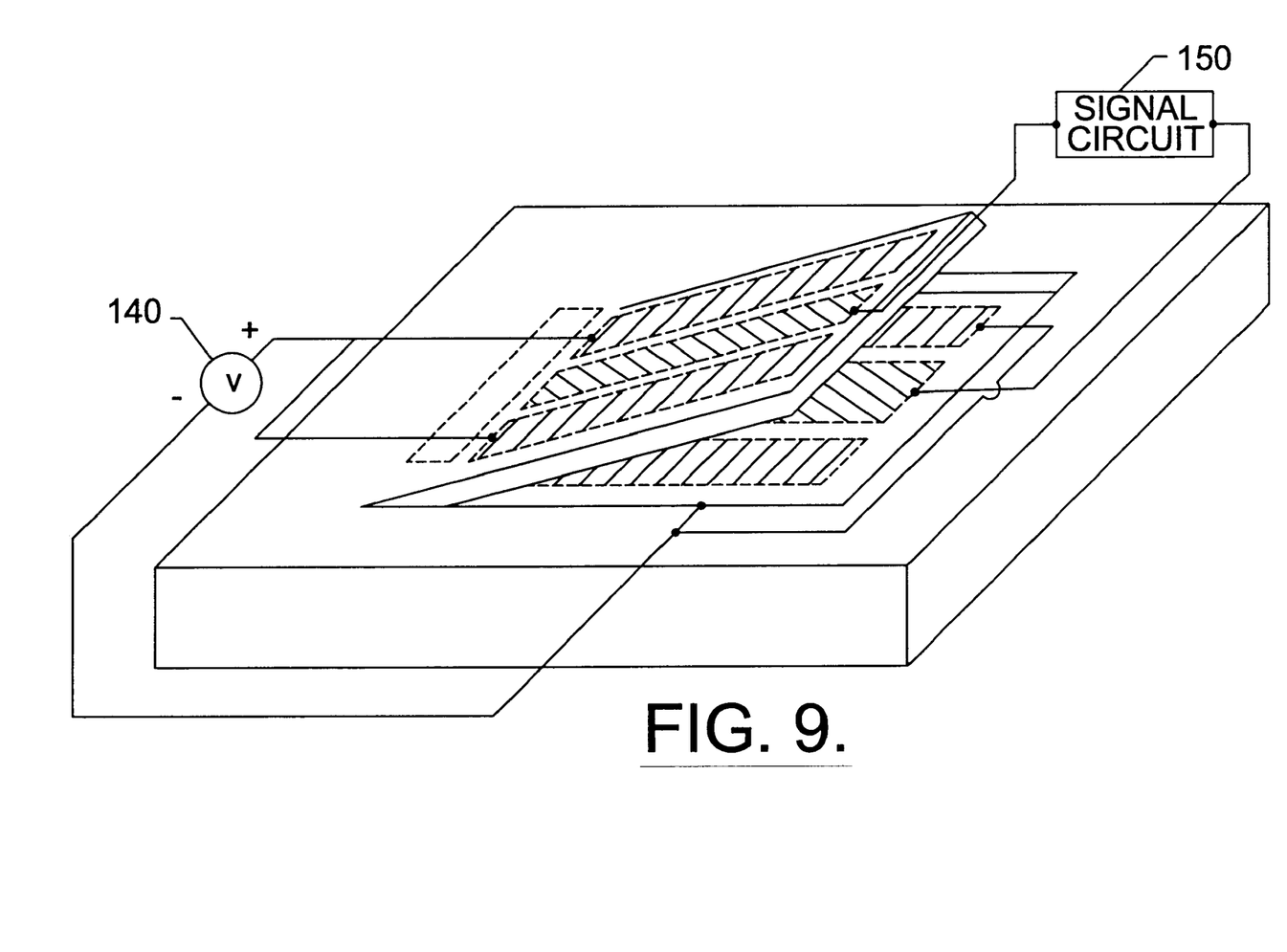
FIG. 9 is a perspective view of a system incorporating a MEMS capacitor structure in accordance with an alternative embodiment of the present invention.

In accordance with another embodiment of the present invention, FIG. 9 depicts a system for electrostatically controlling variable capacitance using the MEMS device of the present invention. The system comprises a variable controlled source of electrostatic energy 140 electrically coupled to the substrate control electrode(s) and composite control electrode(s) of the MEMS device and an electrical signal circuit 150 coupled to the substrate signal electrode and composite signal electrode. Preferably, the source of electrostatic energy is a voltage source. A voltage is applied to the substrate control electrode(s) and the composite control electrode(s) that serves to control the positioning (i.e. biasing) of the moveable composite. The biasing of the moveable composite controls the separation, and therefore capacitance, of the signal electrodes. Capacitance is directly proportional to the area of either signal electrode and indirectly proportional to the distance between the electrodes. Thus the charge (Q of the capacitor) can be controlled by selectively choosing the material and thickness of the composite electrodes, the shape of the signal electrodes and by the thickness of the insulator layers in between the electrodes. Those of ordinary skill in the art will recognize that sources of electrical energy, and signal circuits can be interconnected in various ways without departing from the intent of the present invention.

In operation, when no electrostatic force is applied to the substrate and composite electrodes the distal portion and optionally the medial portion of the moveable composite are biased in the separated position, providing a low capacitance. Preferably, the portion(s) are biased to curl naturally away and increase the separation from the underlying planar surface. As described, certain predetermined portion(s) of the moveable composite can also be biased in a position parallel to the underlying planar surface of the substrate. The application of electrical charge to the substrate electrode and moveable composite electrode creates an electrostatic attraction between them, causing the movable biased portion(s) to uncurl and conform to the surface of the underlying planar surface. For uniformity in the curling and uncurling of the moveable composite, the surface of the moveable composite should be as consistent as possible and, hence, it is preferred that the surface generally be close to fully covered by the electrodes.

The present invention provides a method of using a MEMS device having a microelectronic substrate, a substrate signal electrode, a substrate control electrode, and a moveable composite. The method comprises selectively generating a variable electrostatic force between the substrate control electrode and the moveable composite control electrode. The method further comprises the step of moving the moveable composite toward the substrate in response to the variable electrostatic force to vary the capacitance between the substrate signal electrode and composite signal electrode. The signal circuit 150 detects the change in capacitance, or it alters operation in response to the change in capacitance. Although not illustrated, there may also be a feedback signal from the signal circuit to the source of electrostatic energy 140 to adjust its output and the resulting capacitance of the MENS device.

Additionally, the present invention provides for a method of making a MEMS device driven by electrostatic forces. The method for making the MEMS device comprises the steps of selecting a microelectronic substrate forming a substrate signal electrode above the planar surface of the substrate, forming at least one substrate control electrode above the planar surface of the substrate and providing an insulating mechanism between the substrate and the electrodes. Additionally, the method comprises forming a release layer over a prescribed portion of the uppermost layer of the substrate construct. Furthering the process, a moveable composite is attached to the uppermost layer of the substrate and overlies the release layer. The moveable composite having a signal electrode, at least one control electrode and a biasing element. Removing the release layer to create an air gap between the substrate construct and the moveable composite completes the method of making the MEMS device.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limiting the scope of the present invention in any way.

That which is claimed:

1. A MEMS (Micro Electro Mechanical System) device driven by electrostatic forces, comprising:

a microelectronic substrate defining a generally planar surface;

a substrate signal electrode forming a layer on said substrate;

a substrate control electrode forming a layer on said substrate and electrically isolated from said substrate signal electrode;

a moveable composite overlying said substrate signal electrode and said substrate control electrode and having a signal electrode, a control electrode and a biasing element, said composite having a fixed portion attached to the underlying substrate, a medial portion adjacent to the fixed portion and a distal portion adjacent to the medial portion, the medial and distal portion being moveable with respect to said substrate signal electrode; and an insulator electrically isolating said substrate signal electrode from said composite signal electrode and said substrate control electrode from said composite control electrode, whereby the capacitance between said substrate signal electrode and said composite signal electrode is varied by changing the separation between said substrate and said composite.

2. A MEMS device according to claim 1, wherein said substrate control electrode is formed in substantially the same layer as said substrate signal electrode.

3. A MEMS device according to claim 1, wherein said substrate signal electrode is of a predetermined shape.

4. A MEMS device according to claim 1, wherein said substrate signal electrode is generally rectangular in shape in relation to a top view perspective.

5. A MEMS device according to claim 1, wherein said substrate control electrode is of a predetermined shape.

6. A MEMS device according to claim 1, wherein said substrate control electrode is generally rectangular in shape in relation to a top view perspective.

7. A MEMS device according to claim 1, wherein said substrate control electrode partially surrounds at least two sides of said substrate signal electrode.

8. A MEMS device according to claim 1, wherein said substrate control electrode is generally shaped to frame a periphery of said substrate signal electrode.

9. A MEMS device according to claim 1, wherein said substrate control electrode comprises two or more substrate control electrodes forming one or more layers on said substrate and electrically isolated from said substrate signal electrode.

10. A MEMS device according to claim 9, wherein said substrate control electrodes are of a predetermined shape.

11. A MEMS device according to claim 9, wherein said substrate control electrodes are of a generally equivalent shape.

12. A MEMS device according to claim 9, wherein said substrate control electrodes are generally rectangular in shape in relation to a top view perspective.

13. A MEMS device according to claim 9, wherein said substrate signal electrode and said substrate control electrodes are generally rectangular in shape in relation to a top view perspective and said substrate control electodes are generally deposited parallel to sides of said substrate signal electrode.

14. A MEMS device according to claim 9, wherein said composite control electrode comprises two or more composite control electrodes forming one or more layers on said composite, electrically isolated from said composite signal electrode and having a predetermined shape which is generally equivalent to the shape of said substrate control electrodes.

15. A MEMS device according to claim 1, wherein said composite signal electrode is of a predetermined shape.

16. A MEMS device according to claim 1, wherein said composite signal electrode is generally rectangular in shape in relation to a top view perspective.

17. A MEMS device according to claim 1, wherein said composite signal electrode is generally equivalent in shape to said substrate signal electrode.

18. A MEMS device according to claim 1, wherein said composite control electrode is of a predetermined shape.

19. A MEMS device according to claim 1, wherein said composite control electrode is generally rectangular in shape in relation to a top view perspective.

20. A MEMS device according to claim 1, wherein said composite control electrode partially surround at least two sides of said substrate composite electrode.

21. A MEMS device according to claim 1, wherein said composite control electrode is generally shaped to frame the periphery of said composite signal electrode.

22. A MEMS device according to claim 1, wherein said composite control electrode is generally equivalent in shape to said substrate control electrode.

23. A MEMS device according to claim 1, wherein said composite control electrode comprises two or more composite control electrodes forming one or more layers on said composite and electrically isolated from said composite signal electrode.

24. A MEMS device according to claim 23, wherein said composite control electrodes are of a predetermined shape.

25. A MEMS device according to claim 23, wherein said composite control electrodes have a predetermined equivalent shape.

26. A MEMS device according to claim 23, wherein said composite control electrodes are generally rectangular in shape in relation to a top view perspective.

27. A MEMS device according to claim 23, wherein said composite signal electrode and said composite control electrodes are generally rectangular in shape in relation to a top view perspective and said composite control electodes are generally deposited parallel to sides of said composite signal electrode.

28. A MEMS device according to claim 1, wherein the distal portion of said composite is positionally biased with respect to said substrate by applying a voltage to said substrate control electrode and said moveable composite control electrode.

29. A MEMS device according to claim 1, wherein said composite conforms, at least in part, to the surface of said microelectronic substrate when said moveable composite distal portion is attracted to said substrate.

30. A MEMS device according to claim 1, wherein said composite signal electrode, said composite control electrode and said composite biasing element are formed from one or more generally flexible materials.

31. A MEMS device according to claim 1, wherein said substrate signal electrode and said substrate control electrode underlie at least substantially the entire area of the distal portion of said composite.

32. A MEMS device according to claim 1, wherein said insulator overlies said substrate signal electrode and said substrate control electrode.

33. A MEMS device according to claim 1, wherein said composite biasing element comprises at least one polymer film layer.

34. A MEMS device according to claim 1, wherein said composite biasing element comprises polymer film layers deposited on opposite sides of a layer comprising said composite signal electrode.

35. A MEMS device according to claim 1 wherein said composite signal electrode, composite control electrode and composite biasing element have different thermal coefficients of expansion.

36. A MEMS device according to claim 1 wherein said composite biasing element comprises at least two polymer films of different thickness.

37. A MEMS device according to claim 1 wherein said composite biasing element comprises at least two polymer films of different coefficients of expansion.

38. A MEMS device according to claim 1, wherein the medial portion of said composite curls away from the substrate surface when no electrostatic force is created between said composite control electrode and said substrate control electrode.

39. A MEMS device according to claim 1, wherein the medial portion of said composite curls toward the substrate surface when no electrostatic force is created between said composite control electrode and said substrate control electrode.

40. A MEMS device according to claim 1, further comprising a source of electrical energy electrically connected to said substrate control electrode and said moveable composite control electrode.

41. A MEMS device according to claim 1, further comprising an electrical signal circuit electrically connected to said substrate signal electrode and said moveable composite signal electrode.

42. A MEMS device driven by electrostatic forces, comprising:

a microelectronic substrate defining a generally planar surface;

a substrate signal electrode forming a layer on said substrate;

a substrate control electrode forming a layer on said substrate and electrically isolated from said substrate signal electrode;

a moveable composite overlying said substrate signal electrode and said substrate control electrode and having a signal electrode, a control electrode and a biasing element, said moveable composite having a fixed portion attached to the underlying substrate, a medial portion defining an air gap between said substrate signal electrode and said composite signal electrode and a distal portion moveable with respect to said substrate signal electrode; and an insulator electrically isolating said substrate signal electrode from said composite signal electrode and said substrate control electrode from said pair of composite control electrodes, whereby the capacitance between said substrate signal electrode and said moveable composite signal electrode is varied by changing the separation between said substrate and said composite.

43. A MEMS device according to claim 42, wherein the medial portion defines a generally constant air gap between said substrate signal electrode and said composite signal electrode.

44. A MEMS device according to claim 42, wherein the medial portion defines a generally decreasing air gap between said substrate signal electrode and said composite signal electrode, with the air gap being largest proximate the fixed portion and decreasing toward the distal portion.

45. A MEMS device according to claim 42, wherein the medial portion defines a contact zone where the air gap decreases to zero at a location between the fixed portion and the distal portion.

46. A MEMS device according to claim 42, wherein said composite biasing element comprises at least one polymer film.

47. A MEMS device according to claim 46, wherein said polymer film is thinner in the medial portion than in the distal portion.

48. A MEMS device according to claim 46, wherein said polymer film is patterned in the medial portion to remove at least some of the polymer film.

49. A MEMS device driven by electrostatic forces, comprising:

a microelectronic substrate defining a generally planar surface;

at least one substrate signal electrode forming a layer on said substrate;

at least one substrate control electrode forming a layer on said substrate and electrically isolated from said substrate signal electrode;

a moveable composite overlying said at least one substrate signal electrode and said at least one substrate control electrode and having at least one signal electrode, at least one control electrode and a biasing element, said composite having a fixed portion attached to the underlying substrate, a medial portion adjacent to the fixed portion and a distal portion adjacent to the medial portion, the medial and distal portion being moveable with respect to said at least one substrate signal electrode; and an insulator electrically isolating said at least one substrate signal electrode from said at least one composite signal electrode and said at least one substrate control electrode from said at least one composite control electrode, whereby the capacitance between said at least one substrate signal electrode and said at least one composite signal electrode is varied by changing the separation between said substrate and said composite.

50. A MEMS device according to claim 49, wherein the number of substrate control electrodes is equivalent to the number of composite control electrodes.

51. A MEMS device according to claim 49, wherein the number of substrate signal electrodes is equivalent to the number of composite signal electrodes.

52. A system for electrostatically controlling variable capacitance, the system comprising:

a variable controlled voltage source;

a MEMS device having a microelectronic substrate comprising a substrate signal electrode layer and an electrically isolated substrate control electrode layer, and an electrically isolated moveable composite having a signal electrode, a control electrode and biasing element, the substrate control electrode and the composite control electrode electrically coupled to said variable controlled voltage source, whereby the movable composite biasing is controlled in response to voltage supplied to the substrate control electrode and the moveable composite control electrode; and an electrical signal circuit electrically coupled to the substrate signal electrode and the composite signal electrode wherein the capacitance therebetween is variable in response to variations in said voltage source.

53. A method of using a MEMS device having a microelectronic substrate having a substrate signal electrode and a substrate control electrode, and a moveable composite having a signal electrode, a control electrode and biasing element, the composite movable in response to an electrostatic force created between the substrate control electrode and the moveable composite control electrode, the method comprising the steps of:

selectively generating a variable electrostatic force between the substrate control electrode and the moveable composite control electrode; and moving the moveable composite with respect to the substrate in response to the variable electrostatic force to vary the capacitance between the substrate signal electrode and composite signal electrode.

54. The method of claim 53, wherein the step of selectively generating a variable electrostatic force further comprises generating variable voltage from a control source electrically connected to the substrate control electrode and the composite control electrode.

55. The method of claim 53, wherein the step of moving the composite further comprises uncurling the composite to lie generally parallel to the substrate.

56. The method of claim 53, wherein the step of moving the composite further comprises curling the composite away from the substrate.

57. The method of claim 53, further comprising the step of altering the operation of an electric circuit in response to the variation of capacitance between the substrate signal electrode and composite signal electrode.

* * * * *